Aug. 5, 1958
L. F. PERKINS
2,845,943
FUEL LINE LOCK
Filed April 28, 1954
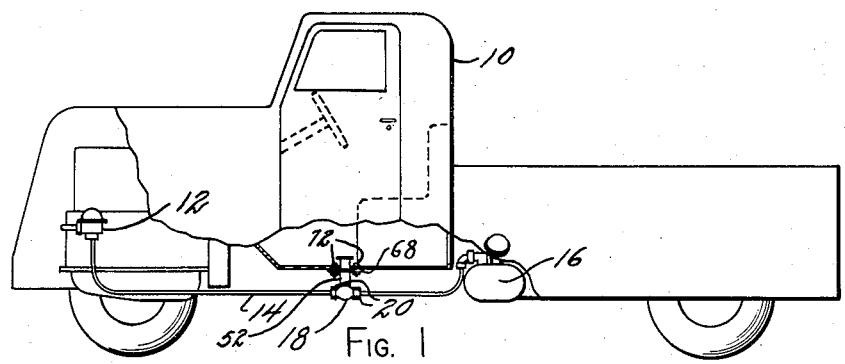
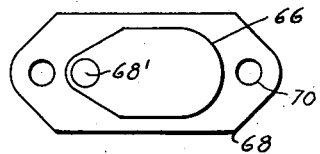
Fig. 2
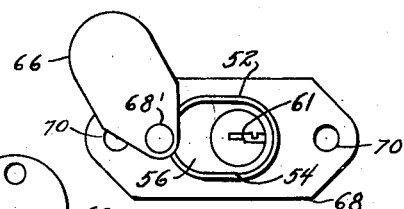
Fig. 3
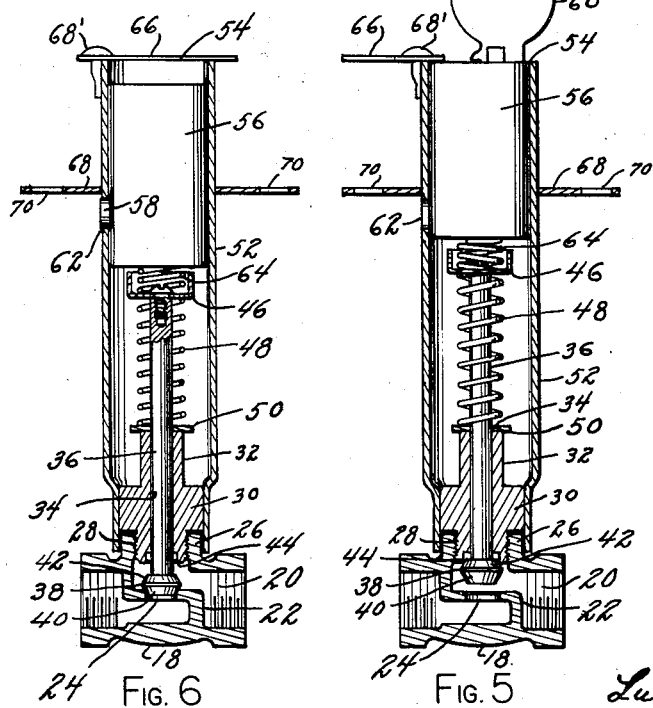
Fig. 6   Fig. 5
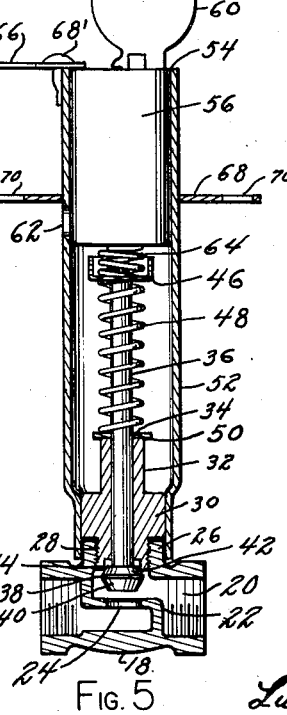
Fig. 4
INVENTOR.
Luther F. Perkins
BY
Wm. O. Ballard
his attorney United States Patent Office 2,845,943
Patented Aug. 5, 1958

2,845,943

FUEL LINE LOCK

Luther Fred Perkins, Sandusky, Ohio

Application April 28, 1954, Serial No. 426,104

1 Claim. (Cl. 137—384.6)

This invention relates to fuel line locks.

An object of this invention is to provide a unitary device incorporating a valve and a lock therefor which may be inserted into a fuel line at some convenient point between the fuel tank and the engine receiving fuel therefrom.

Another object of this invention is to provide a fuel line lock which may be conveniently mounted at a desired position on a motor vehicle so that the fuel line may be key locked and unlocked at will, thereby serving as a vehicle theft preventing means.

Another object of this invention is to provide a fuel line valve element wherein a single element may be used to seal the flow of fuel therethrough, and also serve as a seal against leakage of fuel from the valve.

And another object of this invention is to provide a key operated fuel line lock wherein the key aperture is protected against fouling by dust and dirt accumulations.

Other objects and advantages of this invention relating to the arrangement, operation and functions of the related elements of the structure, to various details of construction, to combination of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a side elevation of a motor vehicle showing a typical installation of the fuel line lock of the invention herein;

Fig. 2 is a plan view of the fuel line lock unit showing the dust cap in lock protecting position;

Fig. 3 is a view similar to Fig. 2 with the dust cap open to expose the lock;

Fig. 4 is a perspective view of the unit herein;

Fig. 5 is a vertical section through the unit of Fig. 4 showing the parts in valve open position; and Fig. 6 is a view similar to Fig. 5 with the parts in valve closed and locked position.

Motor vehicle 10 is herein shown as a light duty pick-up truck, but the invention herein may be installed in any self-driven vehicle propelled by an internal combustion engine receiving fuel through a line from a supply tank. The device is particularly useful on trucking and construction vehicles to prevent their unauthorized movement during non-working hours.

In the example disclosed herein, truck 10 is provided with an internal combustion engine, including a carburetor 12 having a fuel line 14 extending thereto from fuel supply tank 16. The line 14 may be cut at any convenient location, and a T-shaped valve body 18 is placed in the line to have the fuel flow therethrough. This T-shaped valve body 18 is provided with a continuous passageway 20 through its oppositely extending arms from an inlet side to an outlet side, and a barrier 22 is incorporated intermediate therein to provide a valve seat 24. This valve seat 24 is in axial alignment with the angularly extending arm of the valve body and this lateral tubular extension 26 is in communication with the passageway 20. The extension 26 is interiorly threaded to receive threaded boss 28 of fitting 30, which fitting has an oppositely extending boss 32. The fitting 30 is provided with an axial opening 34 therethrough serving as a bearing for valve stem 36 reciprocably mounted therein. This stem 36 extends into the valve body 18 to mount valve head 38, terminating in a frusto-conical portion 40 adapted to cooperate with the seat 24 as a closure or sealing element therefor.

The head 38 is also provided with a reverse frusto-conical portion 42, which coacts with seat 44 in the outer terminus of the boss 28, so that when the valve is open this latter portion 42 will seal the bearing against any leakage therethrough from the passageway 20. The valve stem 36 extends from the double valve head 38, 40, 42, through the bearing 34 and outwardly therebeyond to mount a cup-shaped element 46 on its remote terminus.

Helical spring 48 about the stem 36 is compressed between the cup-shaped element 46 and the outer end of the boss 32. A washer 50 may be placed between the spring 48 and the boss 32 to provide a substantial seat for the spring. Spring 48, being under compression, urges the stem outwardly from the valve body 18, and thereby shifts the valve head 38 clear of the seat 24, allowing a free flow of fuel through the valve body 18. A sheet metal tubular element 52 has one end thereof press-fitted onto the fiitting 30 to encase the same and provide a housing about the valve stem. This tubular housing 52 extend outwardly beyond the valve stem to terminate in open end 54. This element 52 may be configured to have desired cross-sectional forms and the portion thereof adjacent the open end 54 may be shaped to snugly receive a commercial barrel-type lock 56.

While the lock 56 is snugly embraced by the element 52 adjacent its open end 54, nevertheless sufficient looseness is provided to allow the lock 56 to be reciprocated toward and away from the open end 54. The type of lock shown herein includes a laterally reciprocable bolt 58 controlled by a key 60 which is insertible in guide aperture 61 exposed through the open end of the housing 52.

Locks of the type herein shown have their bolts 58 normally thrust outwardly from the lock body and are withdrawn into the lock body by manipulation of the key. Therefore, as the lock 56 is adjacent the open end 54, the bolt 58 will be held within the lock body by the wall of the housing 52 and when such lock is thrust inwardly and the bolt 58 comes into registry with aperture 62 in the housing 52, such bolt will spring into the aperture and thereby secure the lock in an inwardly thrust position.

A second helical spring 64, which is of materially greater strength than the spring 48, is inserted between the lock 56 and the cup-shaped element 46 so that when the lock 56 is thrust inwardly into the housing 52, this second spring will overcome the resistance of the first spring and cause the valve stem to thrust the valve head sealing portion 40 against the valve seat 24, thereby closing the valve, and the spring 64 is of such strength that any wear which may develop in the valve seat 24 is compensated for by the thrust of this spring.

The lock 56 may be manually thrust downwardly into the housing 52 and the valve will be closed, thereby preventing any flow of fuel from the tank 16 to the carburetor 12, so that if attempt is made to operate the vehicle with the fuel line closed, it can be driven but a very short distance, and then, of course, cease to function further. In order to open the valve, the key 60 is inserted into the aperture 61 and the bolt 58 is withdrawn into the lock, then the spring 48 will operate to open the valve and return the lock body to have its key end approximately flush with the open end 54 of the housing 52.

In order to prevent the lock from becoming fouled, the washer 50 and cup-shaped element 46 permit the use of a comparatively large diameter spring 48, and furthermore a dust cap 66 is mounted to close the open end 54, which may be swung clear thereof on its pivot pin mounting 68'. When outwardly swung to expose the key aperture 61, a portion of this dust cap or plate 66 may still extend over the open end 54 to provide a stop against the lock 56 moving outwardly beyond the housing 52.

A wing providing plate 68 is welded to the housing 52, intermediate its length, and is provided wtih apertures 70 for receiving bolts or other fastening elements 72 to mount the device at a chosen location in the vehicle 10, which may be on the floor of the vehicle or even on the dash board, if the fuel line is convenient for such an installation.

Only a person or persons authorized to drive the vehicle 10 is provided with a key 60 which fits an individual lock supplied in the units, and such key operates to unlock the valve, while a locking thereof is accomplished by mere manual pressure against the key end of the lock to slide the same into housing 52.

There is thus provided a simple contact fuel line lock which may be installed as an accessory and which may be easily and quickly inserted into a fuel line at any convenient position with the lock at some convenient point. Assembly of the valve body and fitting is protected by the housing 52, as are the remaining parts, defeating any attempt to remove the accessory by ordinary tools, which is an added protection against possible tampering with the installation.

It is to be understoood that the above description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation, and it is not intended to limit the scope of the following claim beyond the requirements of the prior art.

What is claimed and desired to secure by United States Letters Patent:

A fuel line lock embodying a valve including a T-shaped body having an inlet and an outlet in aligned portions thereof, and providing a valve seat therebetween in alignment with the lateral portion of said body, said lateral portion mounting a fitting providing a boss extension of said portion and a bearing in axial alignment with said valve seat, an outwardly extending sleeve having one end thereof embracing said boss and providing a chamber adjacent thereto, a valve stem reciprocably mounted in said bearing and extending into said chamber, said valve stem having a head on one end to cooperate with said seat to seal the same, a cup-shaped head on the opposite end of said stem within said chamber, a first spring coacting between said fitting and cup-shaped head normally urging said valve stem away from said seat, said sleeve providing a slideway remote from said fitting, and having a lateral aperture therethrough, a locking mechanism reciprocably mounted in said slideway including a key-operated bolt to engage said aperture for holding said mechanism within the sleeve, and a second spring between said locking mechanism and the cup-shaped head, said second spring in longitudinal alignment with the first spring and having a materially greater thrust than the first spring.

References Cited in the file of this patent

UNITED STATES PATENTS

| 985,100 | Austin | Feb. 21, 1911 |
| 1,040,509 | Cleveland | Oct. 8, 1912 |
| 1,366,229 | White | Jan. 18, 1921 |
| 1,403,086 | Kennedy | Jan. 10, 1922 |
| 1,441,317 | Walsh | Jan. 9, 1923 |
| 1,621,486 | Bingaman | Mar. 22, 1927 |
| 2,539,088 | Leach | Jan. 23, 1951 |

FOREIGN PATENTS

| 33,558 | Switzerland | 1905 |